United States Patent [19]

Marks

[11] Patent Number: 5,478,131
[45] Date of Patent: Dec. 26, 1995

[54] CAR SUN VISOR WITH ADJUSTABLE PANEL

[76] Inventor: Nathan Marks, 21961 Arriba Real, Boca Raton, Fla. 33433

[21] Appl. No.: 421,613

[22] Filed: Apr. 13, 1995

[51] Int. Cl.$^6$ ..................................................... B60J 3/00
[52] U.S. Cl. ................................ 296/97.6; 296/97.8
[58] Field of Search .............................. 296/97.4, 97.6, 296/97.8

[56] References Cited

U.S. PATENT DOCUMENTS

| | | | |
|---|---|---|---|
| 4,828,314 | 5/1989 | Gavagan | 296/97.8 |
| 5,016,938 | 5/1991 | Tschan | 296/97.8 |
| 5,042,867 | 8/1991 | Crotty, III et al. | 296/97.8 |
| 5,104,174 | 4/1992 | Gute | 296/97.8 X |

Primary Examiner—Andrew C. Pike
Attorney, Agent, or Firm—Robert M. Downey

[57] ABSTRACT

A sun visor for an automobile includes a base visor portion having a top panel and a bottom panel each including a front surface, a rear surface, an upper edge, a lower edge, and opposite side edges, and a spacer element disposed between and attached to the top and bottom panels, maintaining the top and bottom panels in spaced, aligned, overlying relation to define a gap therebetween. A central panel is slidably held within the gap in sandwiched relation between the top and bottom panels and includes a peripheral zone and a pair of identically shaped channels disposed in adjacent relation to one another in an upper central zone. Guide members travel within the guide channels to permit movement of the central panel in predetermined directions throughout a range of selectively adjusted positions so that the central panel extends partially from between the top and bottom panels, exposing portions of the peripheral zone at different locations about the sides and bottom of the base visor portion.

8 Claims, 3 Drawing Sheets

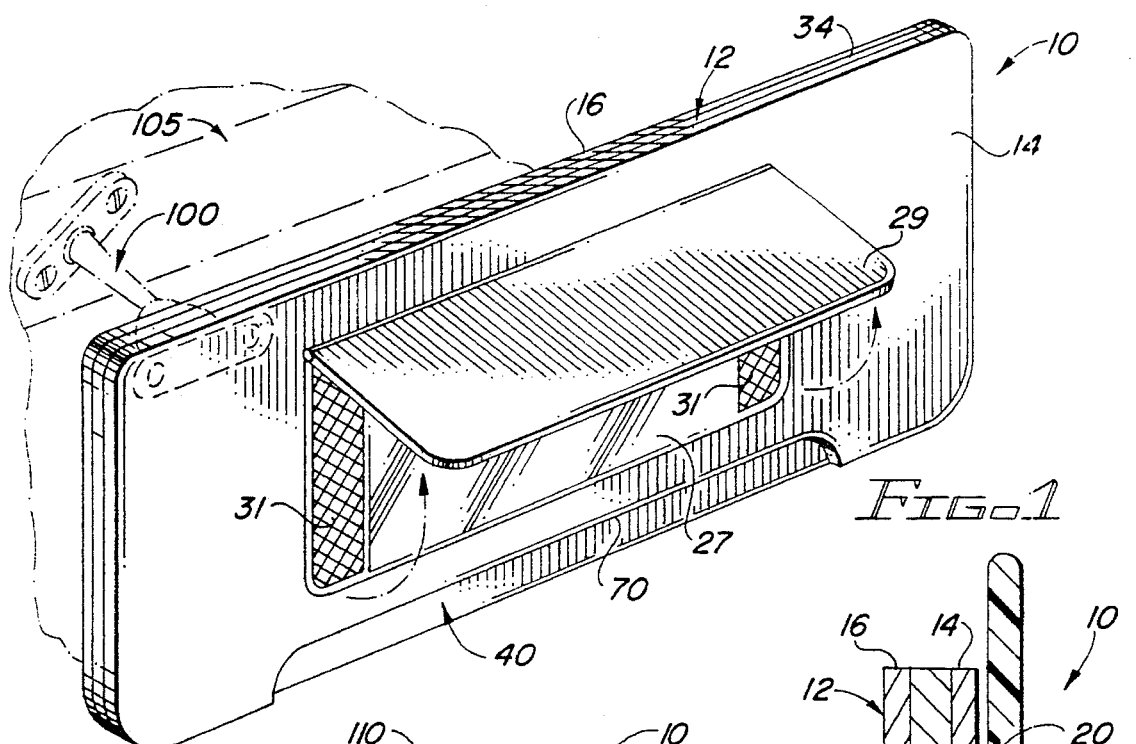
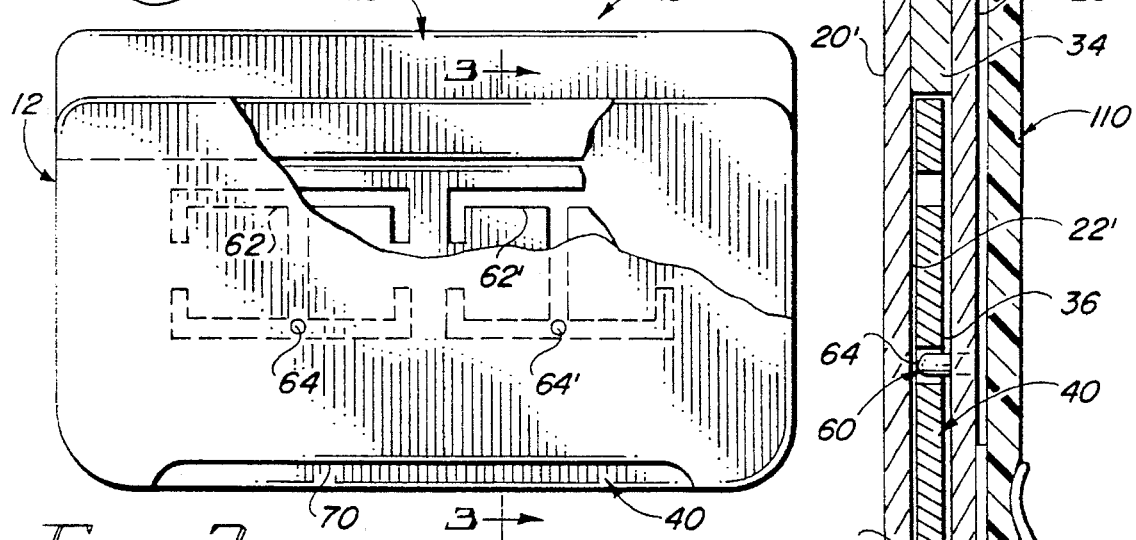
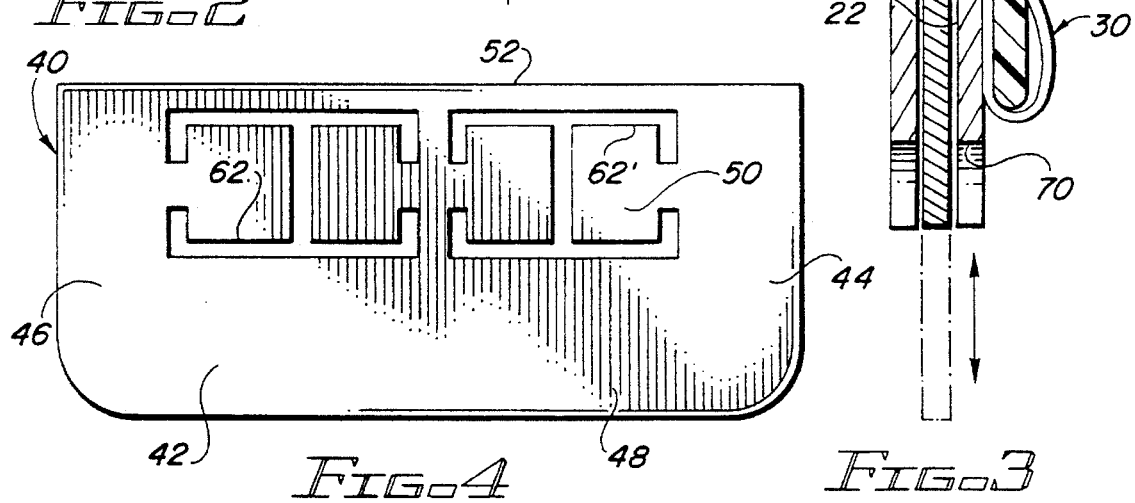

CAR SUN VISOR WITH ADJUSTABLE PANEL

BACKGROUND OF THE INVENTION

FIELD OF THE INVENTION

The present invention relates to adjustable sun visors, and more particularly, to a sun visor adapted to be attached to a pre-existing visor in a vehicle or, alternatively, factory installed in a new vehicle and including an adjustable panel movable in relation to a fixed base throughout a plurality of adjusted positions.

DESCRIPTION OF THE RELATED ART

In the past, there have been numerous devices developed for the purpose of shielding the sun's rays from the eyes of drivers and passengers in automobiles. Virtually all automobiles include visors mounted near the top frame of the windshield, on opposite sides of the rearview mirror, for both the front passenger and driver. In most instances, these standard visors are structured to swing downwardly from the roof in blocking relation to an upper portion of the windshield to shield the sun's rays. However, the structural configuration of automobile sun visors creates a gap on both sides which remains unblocked. Specifically, there remains a space between the inboard edge of the visor and the rearview mirror for both the driver's visor and the passenger's visor. Further, a space usually exists between outboard edges of the visors and the vertical extensions of the windshield frame.

The constant change in direction of travel of an automobile relative to the location of the sun, as well as the change in the elevation of the sun in the sky at various times of day, results in the sun's rays shining through an automobile's windows from many obscure directions at different times. While there have been numerous devices developed in the past to enhance or increase the shielding capabilities of conventional sun visors in automobiles, most are limited in the number of adjustment positions to block the sun's rays. Some of these devices are limited to either longitudinal or vertical movement of glare shields to increase the blocking area of the visor. Others are more complex and are not suited for attachment to pre-existing visors. Most importantly, the sun visor devices and attachments developed in the past are not entirely capable to adequately block the sun's rays from the eyes of drivers and passengers in all directions.

Accordingly, there is a need for a simple and relatively inexpensive sun visor device having the ability to block out the sun's rays from the eyes of drivers and passengers in an automobile in every direction in which the sun's rays might otherwise interfere with the occupant's field of vision.

SUMMARY OF THE INVENTION

The present invention is directed to a sun visor device for an automobile comprising a base visor portion including a top rigid panel and a bottom rigid panel, the top and bottom panels being congruently shaped and configured and each including a front surface, a rear surface, an upper edge, a lower edge, and opposite side edges. A spacer element is disposed between and attached to the top and bottom panels, maintaining the top and bottom panels in spaced, aligned, overlying relation and forming a gap between the panels. A central panel is slidably fitted within the gap in sandwiched relation between the top and bottom panels. The central panel includes a peripheral zone defined about opposite side portions and a lower portion thereof, and a normally concealed upper central zone surrounded by an upper edge of the central panel and the peripheral zone. A pair of identically dimensioned, adjacently disposed guide channels are formed in the upper central zone of the central panel, each being formed and configured in a generally I-shaped configuration. Guide pins, disposed in spaced relation to one another, extend into a respective one of the guide channels in captivated relation therein and are structured and disposed for travel along a length of the channels to permit sliding movement of the central panel relative to the top and bottom panels so that at least a portion of the peripheral zone of the central panel is exposed exteriorly of said gap at a plurality of selectively adjusted positions relative to the opposite side edges and the lower edges of the top and bottom panels.

With the foregoing in mind, it is a primary object of the present invention to provide a sun visor device adapted for quick, simple attachment to a pre-existing visor in a vehicle or, alternatively, for factory installation in a newly manufactured vehicle, wherein the device includes an adjustable panel movable in relation to a fixed base through a full range of adjusted positions to block the sun rays in all directions which might otherwise impair the vision of a driver or passenger in the vehicle.

It is a further object of the present invention to provide a highly versatile, adjustable sun visor as set forth above which is specifically designed to increase safety by enlarging the shielding area of a conventional sun visor at virtually any select location where the sun's rays might otherwise fail to be blocked by a conventional sun visor.

It is a further object of the present invention to provide an adjustable sun visor as set forth above which is easy to install, being comprised of a completely enclosed unit with no external parts or assembly required.

It is still a further object of the present invention to provide an adjustable sun visor assembly as set forth above wherein an adjustable panel is movable both vertically and horizontally through a full range of adjusted positions to block the sun's rays from the eyes of drivers and passengers in an automobile in every direction in which the sun's rays might otherwise interfere with the occupant's field of vision.

BRIEF DESCRIPTION OF THE DRAWINGS

For a fuller understanding of the nature of the present invention, reference should be had to the following detailed description taken in connection with the accompanying drawings in which:

FIG. 1 is a front perspective view of one embodiment of the sun visor device of the present invention;

FIG. 2 is a top plan view, in partial cutaway, of the sun visor device of FIG. 11;

FIG. 3 is a side sectional view taken along the plane of the line 3—3 of FIG. 2;

FIG. 4 is a top plan view of a central panel of the present invention;

Like reference numerals refer to like parts throughout the several views of the drawings.

DETAILED DESCRIPTION OF THE PREFERRED EMBODIMENT

Figure 11:
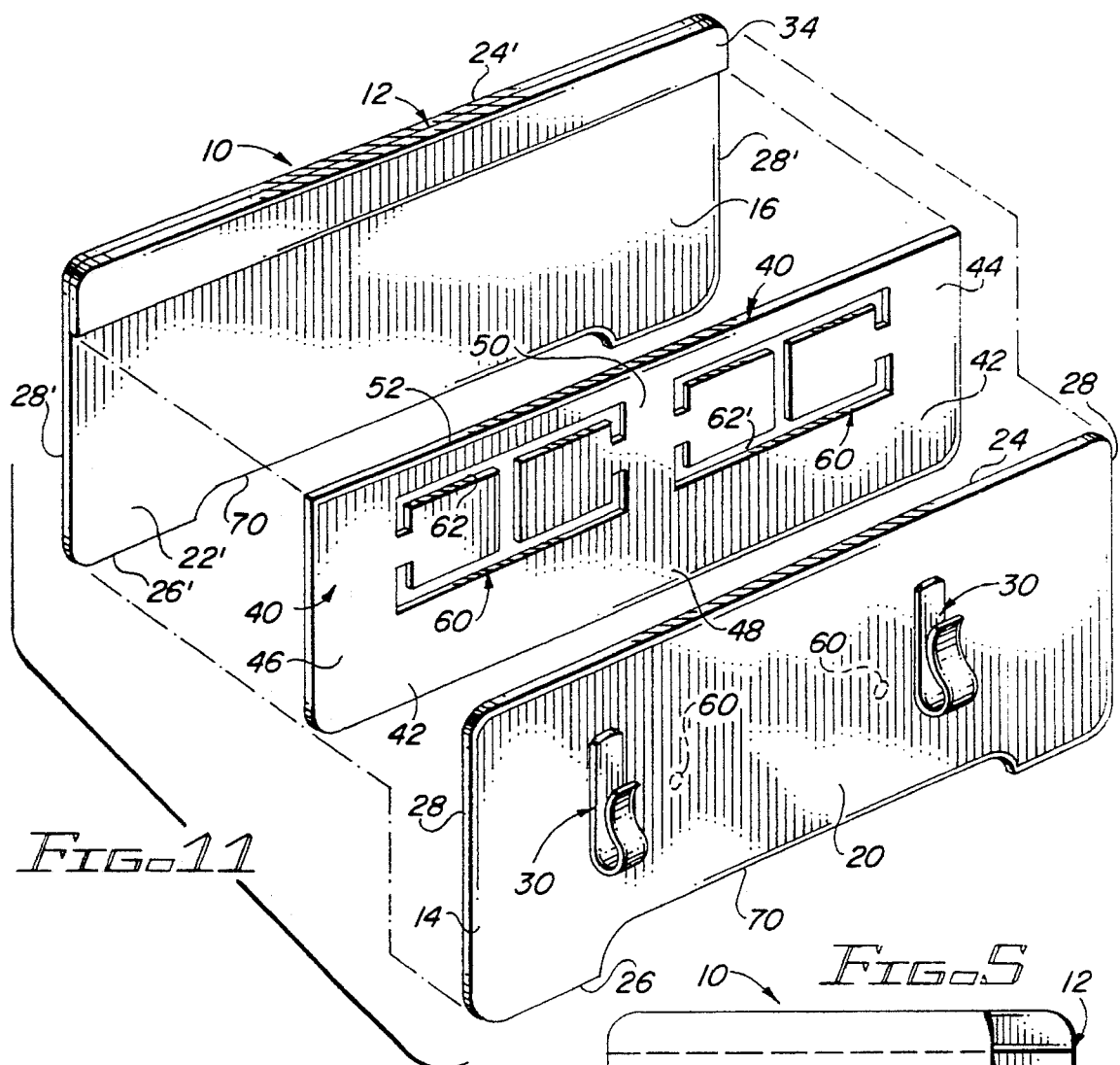
FIG. 11 is an exploded view of the sun visor device of the present invention, designed or attachment to a pre-existing visor in a vehicle.
Figure 6:
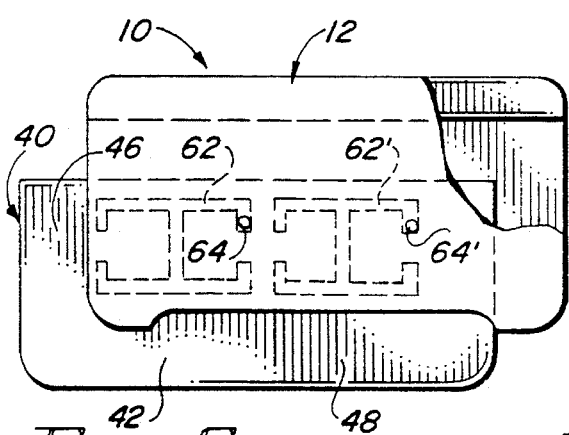
FIG. 6 is a top plan view of the sun visor device showing the central panel in another adjusted position with a side and lower peripheral zone of the central panel extending from a remainder of the device.
Figure 5:
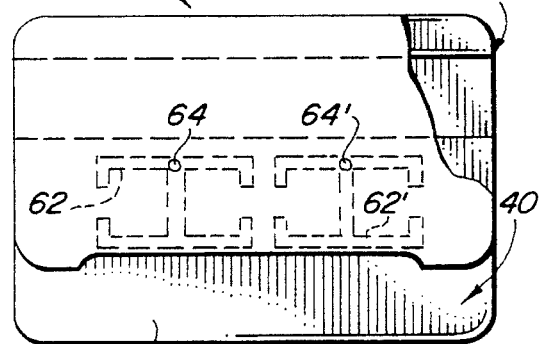
FIG. 5 is a top plan view of the sun visor device, in partial cutaway, illustrating the central panel in an adjusted position relative to a remainder of the device with a lower peripheral edge zone thereof extending downwardly from a base visor portion.
Figure 7:
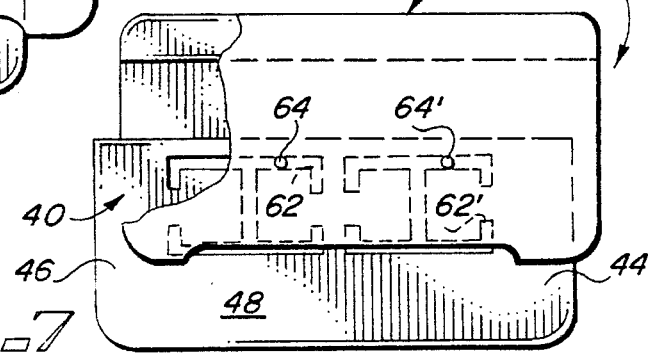
FIG. 7 is a top plan view, in partial cutaway, illustrating the central panel in still another adjusted position relative to a remainder of the device.
Figure 8:
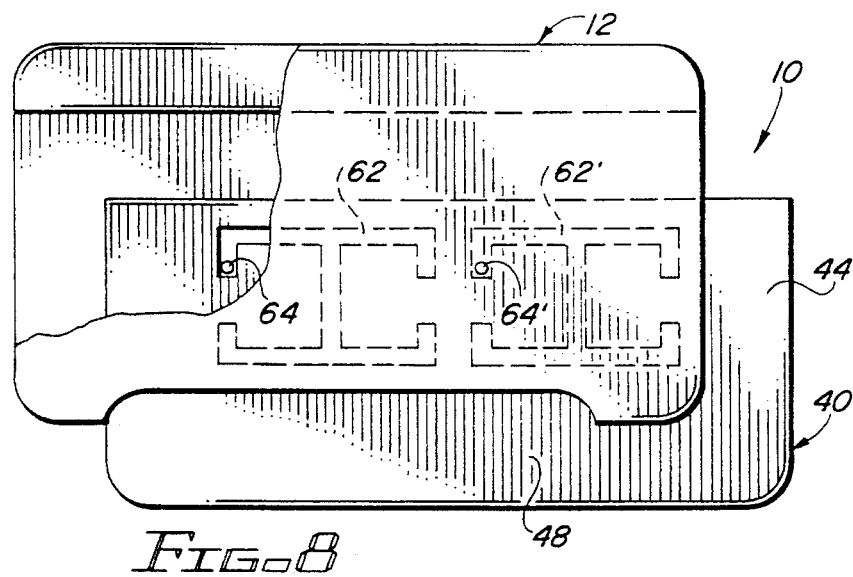
FIG. 8 is a top plan view illustrating the central panel in yet another adjusted position relative to a remainder of the device.
Figure 9:
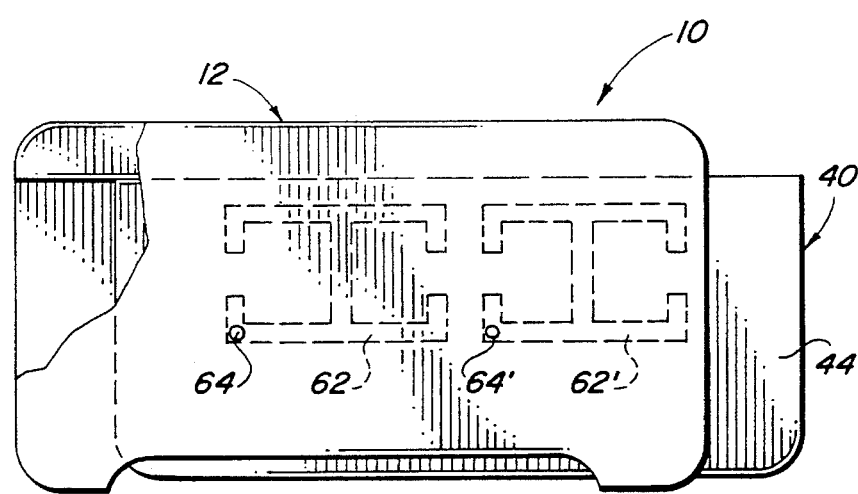
FIG. 9 is a top plan view illustrating the central panel in another adjusted position.
Figure 10:
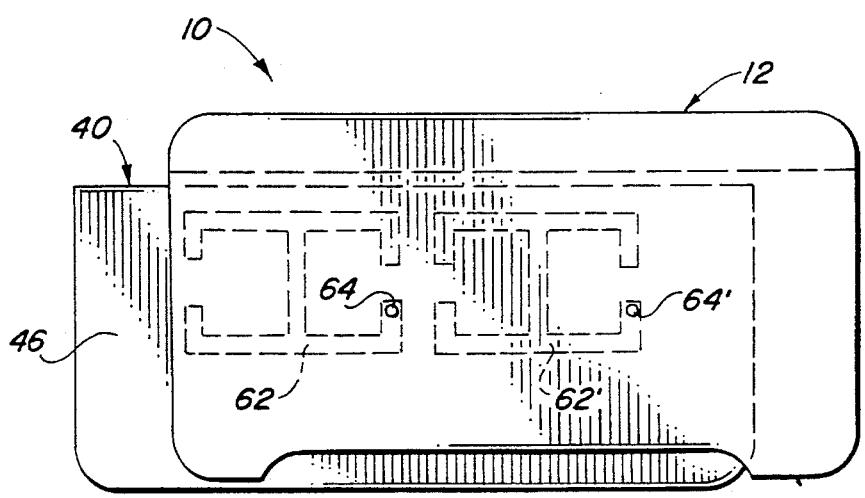
FIG. 10 is a top plan view illustrating the central panel in still another adjusted position.

Referring to the several views of the drawings, there is illustrated the present invention, generally indicated as 10, directed to a sun visor device for an automobile. The device 10 includes a base visor portion 12 which, in the various preferred embodiments illustrated in the drawings, includes a top rigid panel 14 and a bottom rigid panel 16, the top and bottom panels being congruently shaped and configured and each including a front surface 20, 20', a rear surface 22, 22', an upper edge 24, 24', a lower edge 26, 26', and opposite side edges 28, 28'. The base visor portion 12 can be permanently installed in a vehicle, such as during manufacturing, wherein a swivel mount 100 attaches to the base visor portion and the frame 105 surrounding the windshield, as seen in FIG. 1. In this embodiment, the top panel 14 may be provided with a mirror 27 having a hinged cover 29 and lights 31, similar to that found on many convention sun visors of modern automobiles. Alternatively, the device can be made for attachment to an existing sun visor 110 in an automobile, as seen in FIGS. 2,3 and 11. In this instance, clips 30 or other attachment means are provided on the base portion for removable attachment of the base portion 12 to the automobile's sun visor 110. The remaining structural elements of the device 10, as described below, applies to both the embodiments of FIGS. 1 and 11.

As best shown in FIGS. 3 and 11, the base visor portion 12 includes a spacer element 34 fitted between the top 14 and bottom 16 panels and attached thereto to form an integral unit. The spacer element 34 maintains the top 14 and bottom 16 panels fixedly attached in spaced, aligned, and overlying relation to one another, forming a gap 36 therebetween.

A central panel 40 is slidably held and maintained within the gap 36 in sandwiched relation between the top 14 and bottom 16 panels, being movable relative to the base visor portion 12. The central panel 40 includes a peripheral zone 42 defined about opposite side peripheral portions 44, 46 and a lower peripheral portion 48 thereof. A normally concealed upper central zone 50 is surrounded by an upper edge 52 of the central panel 40 and the surrounding peripheral zone 42.

The direction and extent of movement of the central panel 40 relative to the base visor portion 12 is defined by a guide assembly 60 which includes a pair of identically dimensioned, adjacently disposed guide channels 62, 62' formed in the upper central zone 50 of the central panel 40. Each of the guide channels 62, 62' is formed and configured in a generally I-shaped configuration, as seen throughout the drawings. The guide assembly 60 further includes first and second guide pins 64, 64' attached to, or formed on, at least one of the panels 14, 16 of the base visor portion 12. The first and second guide pins 64, 64' are disposed in spaced relation to one another, extending within the gap 36. The guide pins 64, 64' are specifically structured and position for captivated receipt into a respective one of the guide channels 62, 62', as best seen in FIG. 3, so as to travel along a length of the channels 62, 62' along sliding movement of the central panel 40. The specific I-shaped configuration of the channels 62, 62' defines the various directions and limitations of the movement of the central panel 40 relative to the base visor portion 12, permitting both vertical and horizontal movement of the central panel 40 throughout a range of selectively adjusted positions. Movement of the central panel 40 is achieved by grasping the lower edge along the lower peripheral portion and pulling the central panel 40 to the left, to the right, or up and down depending on the desired position of adjustment and the location of the guide pins 64, 64' in the respective channels 62, 62'. A cutout portion 70 along the lower edge of the top 14 and bottom 16 panels exposes a portion of the lower peripheral edge of the central panel 40, enabling grasping thereof so that the central panel 40 can be selectively moved to the desired adjusted position, wherein at least a portion of the peripheral zone of the central panel 40 extends from the sides and/or bottom of the base visor portion, thereby increasing the overall shielding area of the device 10 and blocking the sun's rays at a particular location beyond the normal shielding area of the base visor portion 12.

What is claimed is:

1. A sun visor for an automobile comprising:

a base including a top rigid panel and a bottom rigid panel, said top and bottom panels being congruently shaped and configured and each including a front surface, a rear surface, an upper edge, a lower edge, and opposite side edges, a spacer element disposed between and attached to said top and bottom panels and maintaining said top and bottom panels in spaced, aligned, overlying relation to define a gap therebetween, a central panel slidable within said gap in sandwiched relation between said top and bottom panels and including a peripheral zone defined about opposite side portions and a lower portion thereof, and a normally concealed upper central zone surrounded by an upper edge of said central panel and said peripheral zone, a pair of identically dimensioned, adjacently disposed guide channels formed in said upper central zone of said central panel, each of said guide channels being formed and configured in a generally I-shaped configuration, and first and second guide pins disposed in spaced relation to one another and each received within a respective one of said guide channels in captivated relation therein and being structured and disposed for travel along a length of said guide channels to define direction and limits of sliding movement of said central panel relative to said top and bottom panels through a plurality of selectively adjusted positions, at least one of said adjusted positions defined by said central panel extending from between said top and bottom panels so that at least a portion of said peripheral zone of said central panel is exposed exteriorly of said gap at different locations relative to said opposite side edges and said lower edges of said top and bottom panels.

2. A sun visor for an automobile comprising:

a base panel portion including a front surface, a rear surface, an upper edge, a lower edge, and opposite side edges, a central panel slidably held on said base panel portion and including a peripheral zone and a pair of identically shaped guide channels disposed in adjacent relation to one another in an upper central zone of said central panel, and guide members on said base panel portion and received within said guide channels in captivated relation therein and being structured and disposed for travel within said guide channels to permit movement of said central panel in predetermined directions throughout a range of selectively adjusted positions so that said central panel extends partially beyond the base panel portion exposing portions of the peripheral zone at different select locations relative to the opposite side edges and, lower edge of the base panel portion.

3. A sun visor as recited in claim 2 wherein said base panel portion includes a top panel, a bottom panel, and a spacer element attached between said top and bottom panels to maintain said top and bottom panels in spaced, aligned, overlying relation to one another and defining a gap therebetween.

4. A sun visor as recited in claim 3 wherein said central panel is slidably held within said gap, being movable therein through said range of selectively adjusted positions.

5. A sun visor as recited in claim 4 wherein said identically shaped channels are formed and configured in a generally I-shaped configuration.

6. A sun visor as recited in claim 5 wherein said guide members include first and second guide pins fixedly attached to at least one of said top and bottom panels of said base panel portion and each being received within a respective one of said channels of said central panel.

7. A sun visor as recited in claim 2 further including attachment means for removably attaching said sun visor to a conventional sun visor in the automobile.

8. A sun visor as recited in claim 7 wherein said attachment means includes at least one clip member specifically structured to receive and grasp a peripheral edge of the conventional sun visor.

* * * * *